(12) United States Patent
Cheng et al.

(10) Patent No.: US 7,891,242 B2
(45) Date of Patent: Feb. 22, 2011

(54) SENSING DEVICE

(75) Inventors: Pi-Ying Cheng, Hsinchu (TW); Kian-Poh Wong, Johor (MY)

(73) Assignee: National Chiao Tung University, Hsinchu (TW)

( * ) Notice: Subject to any disclaimer, the term of this patent is extended or adjusted under 35 U.S.C. 154(b) by 518 days.

(21) Appl. No.: 12/027,488

(22) Filed: Feb. 7, 2008

(65) Prior Publication Data
US 2008/0271528 A1    Nov. 6, 2008

(30) Foreign Application Priority Data
May 2, 2007    (TW) ................ 96115622 A

(51) Int. Cl.
G01F 23/26    (2006.01)
(52) U.S. Cl. ................................... 73/304 R
(58) Field of Classification Search ............... 73/304 R
See application file for complete search history.

(56) References Cited

U.S. PATENT DOCUMENTS

| | | |
|---|---|---|
| 3,484,829 A | 12/1969 | Erickson |
| 4,421,189 A | 12/1983 | Watkins |
| 4,473,234 A | 9/1984 | Egen |
| 4,532,968 A * | 8/1985 | Leonard ............... 141/5 |
| 4,566,706 A | 1/1986 | Bihler |
| 4,569,409 A | 2/1986 | Kluth |
| 4,790,548 A | 12/1988 | Decelles |
| 4,919,489 A | 4/1990 | Kopsco |
| 4,962,941 A | 10/1990 | Rembos |
| 5,020,818 A | 6/1991 | Oxford |
| 5,158,309 A | 10/1992 | Quigg |
| 5,197,558 A | 3/1993 | Misawa |
| 5,263,547 A | 11/1993 | Alber |
| 5,273,296 A | 12/1993 | Lepek |
| 5,308,098 A | 5/1994 | Shea |
| 5,423,563 A | 6/1995 | Wild |
| 5,577,567 A | 11/1996 | Johnson |
| 5,676,215 A | 10/1997 | Misawa |
| 5,701,965 A | 12/1997 | Kamen |
| 5,868,403 A | 2/1999 | Culp |

(Continued)

FOREIGN PATENT DOCUMENTS

TW    134144    5/1990

(Continued)

*Primary Examiner*—Hezron Williams
*Assistant Examiner*—Alex Devito
(74) *Attorney, Agent, or Firm*—Muncy, Geissler, Olds & Lowe, PLLC

(57) ABSTRACT

The present invention discloses a sensing device, wherein a hemispherical container containing a liquid dielectric, and the hemispherical container has more than two pairs of electrodes, and the liquid dielectric can trigger the conduction states of the electrodes. A corrosion-resistant material envelops the container. A precision valve is arranged in the container and used to adjust the level of the liquid dielectric and the sensitivity of the sensing device. A buffer necking part is also arranged in the container and used to prevent from non-expected vibration-induced contact between the electrodes and the liquid dielectric. A leakage-proof detection device envelops the hemispherical container, the liquid dielectric, the precision valve, and the buffer necking part and functions to prevent from the leakage of the liquid dielectric. Thus, the present invention can provide an adjustable multi-directional tilt-sensing device for level control.

10 Claims, 4 Drawing Sheets

U.S. PATENT DOCUMENTS

| | | | |
|---|---|---|---|
| 5,971,091 A | 10/1999 | Kamen | |
| 5,975,225 A | 11/1999 | Kamen | |
| 6,282,804 B1 * | 9/2001 | Jiang | 33/366.21 |
| 6,325,167 B1 | 12/2001 | Jiang | |
| 6,328,120 B1 | 12/2001 | Haussler | |
| 6,341,784 B1 | 1/2002 | Carstens | |
| 6,343,664 B2 | 2/2002 | Morrell | |
| 6,415,879 B2 | 7/2002 | Kamen | |
| 6,422,576 B1 | 7/2002 | Michaeli | |
| 6,443,250 B1 | 9/2002 | Kamen | |
| 6,443,251 B1 | 9/2002 | Morrell | |
| 6,550,787 B1 | 4/2003 | Chu | |
| 6,615,938 B2 | 9/2003 | Morrell | |
| 6,619,414 B2 | 9/2003 | Rau | |
| 6,644,426 B1 | 11/2003 | Larue | |
| 6,799,649 B2 | 10/2004 | Kamen | |

FOREIGN PATENT DOCUMENTS

| | | |
|---|---|---|
| TW | 204495 | 4/1993 |
| TW | 226782 | 7/1994 |
| TW | 301605 | 4/1997 |
| TW | 329964 | 4/1998 |
| TW | 350328 | 1/1999 |
| TW | 437388 | 5/2001 |
| TW | 472137 | 1/2002 |
| TW | 502863 | 9/2002 |
| TW | 511657 | 11/2002 |
| TW | 522137 | 3/2003 |
| TW | 567159 | 12/2003 |
| TW | M241637 | 8/2004 |
| TW | M286664 | 2/2006 |
| TW | M289015 | 3/2006 |

* cited by examiner

SENSING DEVICE

BACKGROUND OF THE INVENTION

1. Field of the Invention

The present invention relates to a sensing device, particularly to a multi-directional tilt-sensing device.

2. Description of the Related Art

In a conventional sensing device, mercury and wires are sealed in a glass tube, wherein the wires function as fixed contacts, and mercury functions as a movable contact. As mercury is a liquid, tilt will cause mercury to move and results in that the fixed contact of the wire is submerged in mercury. Thus, the conventional sensor can function as a control switch. However, such a sensor cannot perform multi-directional control but can only function as a unidirectional switch.

Thus, a multi-directional mercury switch was proposed to overcome the disadvantage of the abovementioned sensor that can only detect unidirectional vibration or inclination. For example, a Taiwan patent No. 226782 proposed an improved mercury switch, which can detect vibration or inclination multi-directionally. In the conventional technology, two conductive pillars are shaped into two rings and arranged inside a glass body. The two rings are equidistantly separated and appropriately arranged along the inner wall of the glass body. The glass body is a disc-like body and has slightly-coned upper and lower surfaces, wherein the height of the glass body gradually decreases from the central protrusion to the perimeter. When the glass body is horizontally placed, mercury is at the center. When the glass body tilts, mercury contacts two conductive pillars, and a signal is thus sent out. Such a conventional technology can indeed achieve multi-directional detection. However, the conduction of the electrodes may be triggered by a slight vibration or inclination. Further, the sensitivity of the switch is unadjustable. When such a switch is used to adjust a movable platform, it may be too sensitive.

Accordingly, the present invention proposes a sensing device to solve the abovementioned problems.

SUMMARY OF THE INVENTION

The primary objective of the present invention is to provide a sensing device, wherein a container containing a liquid dielectric and at least two pairs of electrodes are used to implement an adjustable multi-directional tilt-sensing device for level control.

Another objective of the present invention is to provide a sensing device, wherein the sensitivity of the sensing device can be controlled by a precision valve.

Further objective of the present invention is to provide a sensing device, wherein a leakage-proof detection device functions as the second defense line for liquid dielectric leakage.

To achieve the abovementioned objectives, the present invention proposes a sensing device, wherein a hemispherical container is used to contain a liquid dielectric, and a corrosion-resistant material envelops the hemispherical container; two pairs of electrodes are arranged inside the hemispherical container and used to switch the conduction states of a circuit; the hemispherical container has a precision valve used to regulate the level of the liquid dielectric; the hemispherical container has a buffer necking part used to avoid non-expected vibration-induced contact between the electrodes and the liquid dielectric; a leakage-proof detection device envelops the hemispherical container, the liquid dielectric, the buffer necking part and the precision valve and functions as the second defense line against liquid dielectric leakage.

Below, the embodiments are to be described in detail in cooperation with the attached drawings to make easily understood the objectives, technical contents, characteristics and accomplishments of the present invention.

DETAILED DESCRIPTION OF THE INVENTION

Figure 1:
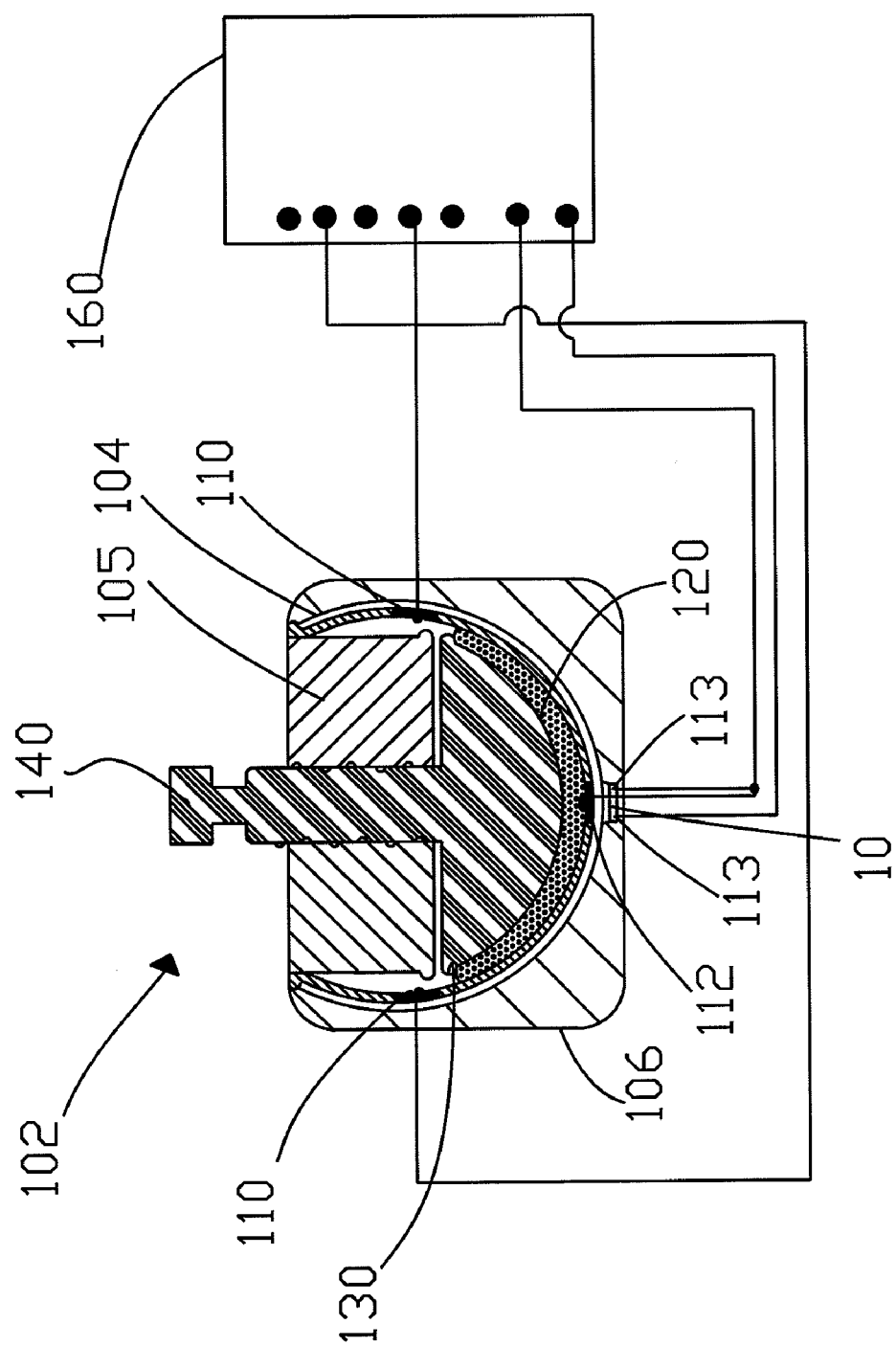
FIG. 1 is a sectional view of a sensing device according to the present invention.

Refer to FIG. 1, a sectional view of a sensing device according to the present invention is shown. In the sensing device 102 of the present invention, a hemispherical container 104 contains a liquid dielectric 120, and a corrosion-resistant material envelops the container 104. The liquid dielectric may be mercury. At least two pairs of contact electrodes 110 are arranged on two sides of the container 104. At least one bottom electrode 112 is arranged in the bottom of the container 104. A circuit connection module 160 is arranged inside the container 104 and used to separate the positive and negative electrodes of the contact electrodes 110 and the bottom electrode 112 lest short circuit occur. The container 104 is fixedly installed inside a leakage-proof detection device 106. The leakage-proof detection device 106 is used to prevent from the harm of liquid dielectric leakage caused by an accident. In addition to the above-mentioned hemispherical container, the container of the sensing device of the present invention may also adopt other shapes to meet different requirements.

Figure 2:
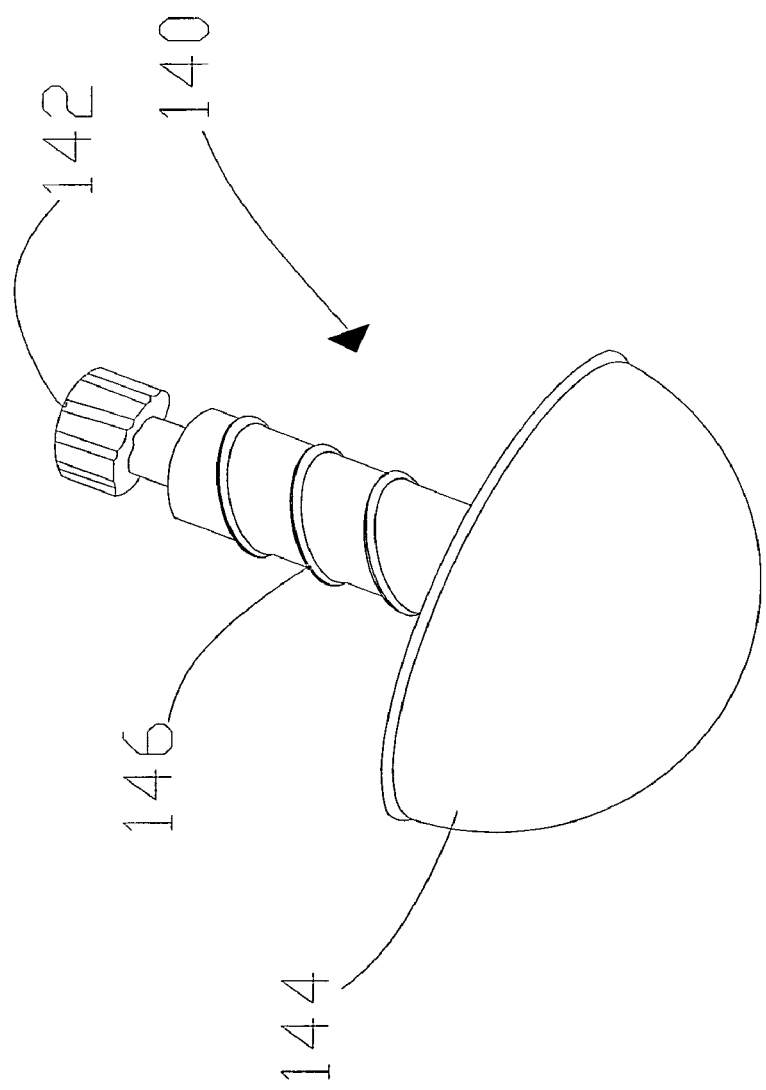
FIG. 2 is a diagram schematically showing a precision valve according to the present invention.
Figure 3:
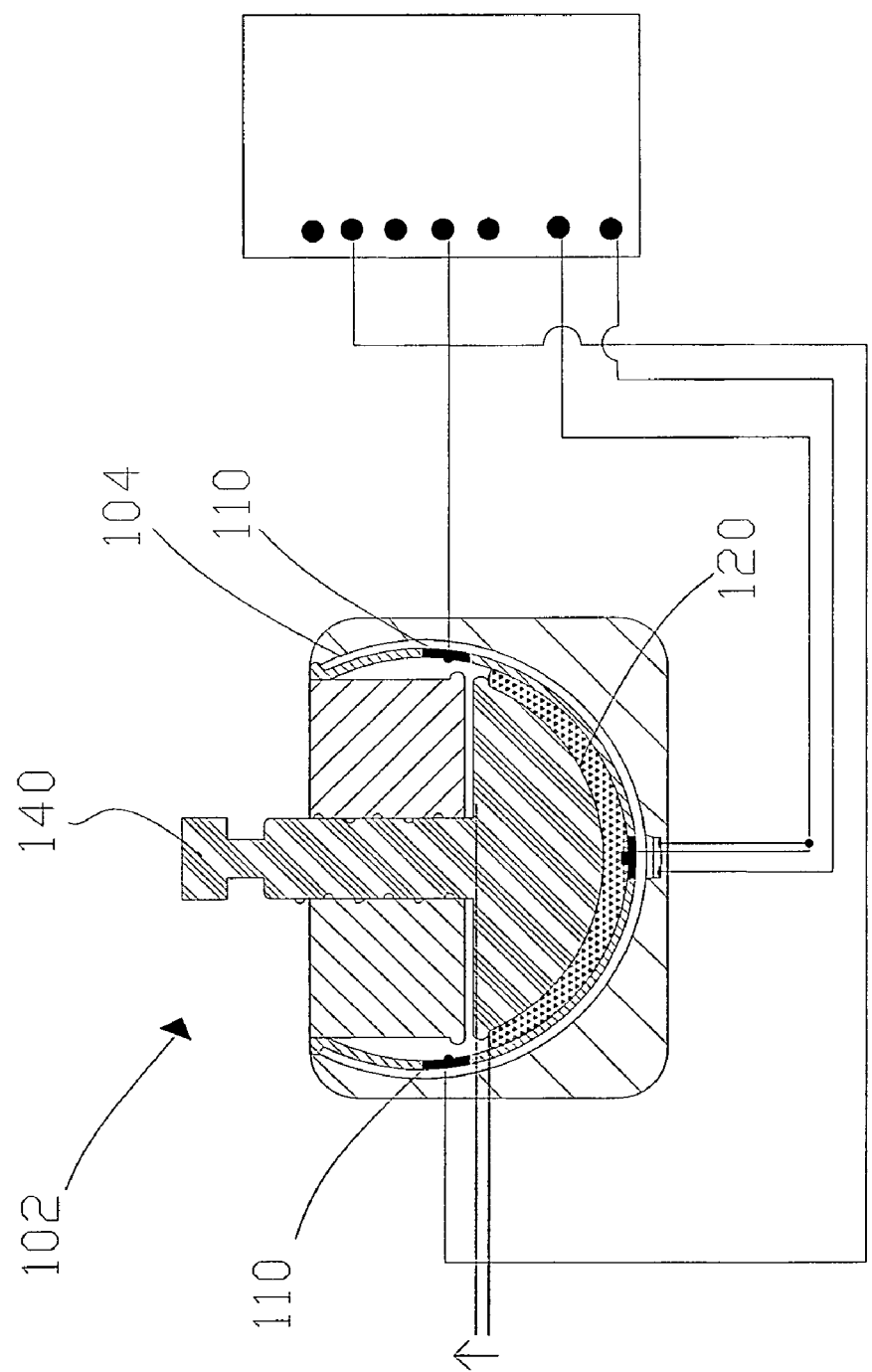
FIG. 3 is a sectional view of a precision valve according to the present invention.

Refer to FIG. 2 and FIG. 3. The container 104 further comprises a precision valve 140. The precision valve 140 has a thread 146, which cooperates with an inner thread of a fixing element 105 to secure the precision valve 140 to the container 104. One end of the precision valve 140 has a rotary knob 142, and the other end has a cone 144. The rotation of the rotary knob 142 can drive the cone 144 to move up or down. As the cone 144 is partially submerged in the liquid dielectric 120, the vertical movement of the cone 144 will change the level of the liquid dielectric 120. The higher the level of the liquid dielectric 120, the smaller the difference between the height of the contact electrode 110 and the height of the liquid dielectric 120, and the smaller the tilt angle required to make the liquid dielectric 120 contact the contact electrode 110, and thus the greater the sensitivity to tilt. Contrarily, the lower the level of the liquid dielectric 120, the greater the difference between the height of the contact electrode 110 and the height of the liquid dielectric 120, and the greater the tilt angle required to make the liquid dielectric 120 contact the contact electrode 110, and thus the smaller the sensitivity to tilt.

Refer to FIG. 1. A leakage-proof detection device 106, which is in the form of an external casing and has a groove 10 at the bottom thereof, is used to envelops the container 104, the liquid dielectric 120, the buffer necking part 130, the precision valve 140 and functions as the second defense line against the leakage of the liquid dielectric 120. A sensing electrode 113 is arranged in the groove 10. When there is a leakage, the liquid dielectric 120 will flow along the inner wall of the leakage-proof detection device 106 to the groove 10, which will trigger the sensing electrode 113 to send signal to the user or to start necessary safety facilities.

Figure 4:
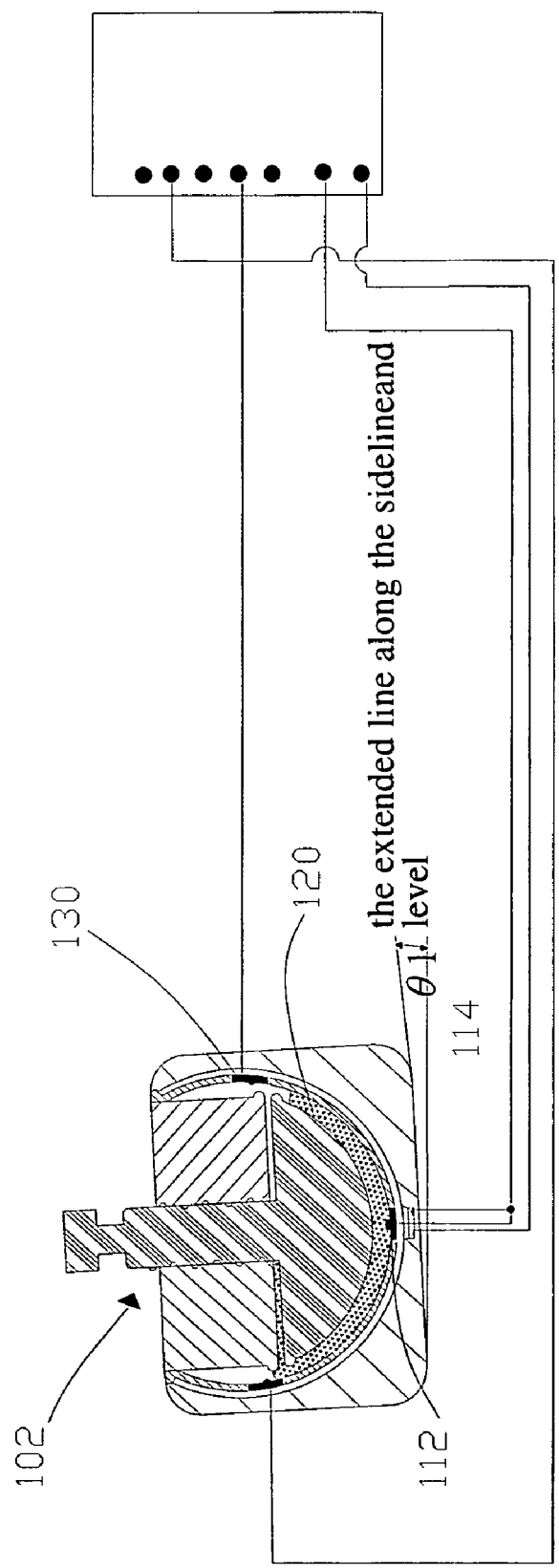
FIG. 4 is a diagram schematically showing a sensing device in a tilt state according to the present invention.

Refer to FIG. 4 a diagram schematically showing a sensing device in a tilt state according to the present invention. When the sensing device of the present invention is attached to a carrier, and when the support seat of the carrier tilts, a part of the contact electrodes 110 contact the liquid dielectric 120. Thus, the liquid dielectric 120 electrically interconnects the contact electrodes 110 and the bottom electrode 112. Therefore, an angle $\theta_1$ is contained between the level of the liquid dielectric 120 and the extended line along the sideline and can be used to detect the tilt state of a platform and facilitate restoring the support seat back to the horizontal state. As the inner wall of the container 104 has at least two pairs of contact electrodes 110, the sensing device of the present invention can detect tilt multi-directionally. The buffer necking part 130 in the container 104 is designed to eliminate the influence of surface tension and to avoid the non-expected vibration-induced contact between the contact electrode 110 and the liquid dielectric 120 during movement. Those described above are the embodiments to exemplify the present invention to enable the persons skilled in the art to understand, make and use the present invention. However, it is not intended to limit the scope of the present invention. Any equivalent modification or variation according to the spirit of the present invention is to be also included within the scope of the claims stated below.

What is claimed is:

1. A sensing device comprising:
   a container having a fixing element and at least two pairs of electrodes;
   a liquid dielectric contained by said container and used to trigger said electrodes in said container and switch conduction states of a circuit;
   a bottom electrode arranged at bottom of said container and used to detect leakage of said liquid dielectric;
   a buffer necking part located inside said container, arranged along a perimeter of the bottom of said fixing element and used to prevent said liquid dielectric from contacting said electrodes;
   a precision valve arranged in said container, penetrating said fixing element with a part thereof emerging from said fixing element and used to adjust level of said liquid dielectric, wherein a high level results in a high sensitivity, and a low level results in a low sensitivity; and
   a leakage-proof detection device enveloping said container, said liquid dielectric, said buffer necking part and said precision valve and used to detect leakage of said liquid dielectric and prevent from leakage of said liquid dielectric.

2. A sensing device according to claim 1, wherein an inner thread is formed inside said fixing element and used to fix said precision valve.

3. A sensing device according to claim 1, wherein a corrosion-resistant material is used to envelop said container to provide a vibration-proof function and a collision-proof function.

4. A sensing device according to claim 1, wherein said container is a hemispherical body.

5. A sensing device according to claim 1, wherein said liquid dielectric is mercury.

6. A sensing device according to claim 1, wherein size of said buffer necking part correlates with surface tension of said liquid dielectric.

7. A sensing device according to claim 1, wherein said precision valve further comprises:
   a cone arranged inside said container, submerged in said liquid dielectric and used to change level of said liquid dielectric; and
   a rotary knob coupled to said cone, arranged above said fixing element and used to drive said cone to move up or down.

8. A sensing device according to claim 1, wherein said leakage-proof detection device is in a form of an external casing.

9. A sensing device according to claim 1, wherein a groove is formed in bottom of said leakage-proof detection device; when said liquid dielectric leaks, said liquid dielectric will flow along inner wall of said leakage-proof detection device to said groove and trigger a sensing electrode arranged in said groove to send a signal to a user or start necessary safety facilities.

10. A sensing device according to claim 1, wherein said leakage-proof detection device has a sensor thereinside to send information about leakage of said liquid dielectric to a user or start necessary safety facilities.

\* \* \* \* \*